United States Patent [19]

Shepard

[11] Patent Number: 5,052,038

[45] Date of Patent: * Sep. 24, 1991

[54] APPARATUS AND METHOD FOR OBTAINING INFORMATION IN A WIDE-AREA TELEPHONE SYSTEM WITH DIGITAL DATA TRANSMISSION BETWEEN A LOCAL EXCHANGE AND AN INFORMATION STORAGE SITE

[75] Inventor: David H. Shepard, Rye, N.Y.

[73] Assignee: Cognitronics Corporation, Stamford, Conn.

[*] Notice: The portion of the term of this patent subsequent to Nov. 1, 2005, has been disclaimed.

[21] Appl. No.: 508,961

[22] Filed: Apr. 12, 1990

Related U.S. Application Data

[60] Continuation of Ser. No. 229,557, Aug. 5, 1988, abandoned, which is a division of Ser. No. 69,828, Jul. 6, 1987, Pat. No. 4,782,509, which is a continuation of Ser. No. 644,811, Aug. 27, 1984, abandoned.

[51] Int. Cl.$^5$ .................... H04M 3/50; H04M 7/00; H04M 11/00
[52] U.S. Cl. ......................... 379/88; 379/97; 379/213; 379/235
[58] Field of Search .................. 379/88, 89, 97, 213, 379/214, 235

[56] References Cited

U.S. PATENT DOCUMENTS

| | | | |
|---|---|---|---|
| 3,403,383 | 9/1968 | Kienzle et al. | 379/69 |
| 3,534,171 | 10/1970 | Shepard et al. | 379/71 |
| 3,820,071 | 6/1974 | Angus | 340/825.33 |
| 3,928,724 | 12/1975 | Byram et al. | 381/43 |
| 4,012,599 | 3/1977 | Meyer | 379/96 |
| 4,229,624 | 10/1980 | Haben et al. | 340/826 |
| 4,255,619 | 3/1981 | Saito | 379/96 |
| 4,313,036 | 1/1982 | Jabara et al. | 379/207 |
| 4,489,438 | 12/1984 | Hughes | 381/51 |
| 4,532,378 | 7/1985 | Nakayama et al. | 379/110 |
| 4,577,062 | 3/1986 | Hilleary et al. | 379/88 |
| 4,649,563 | 3/1987 | Riskin | 379/97 |
| 4,650,927 | 3/1987 | James | 379/96 |
| 4,677,659 | 6/1987 | Dargan | 379/97 |
| 4,716,583 | 12/1987 | Grover et al. | 379/88 |

FOREIGN PATENT DOCUMENTS 1291796 4/1969 Fed. Rep. of Germany .
2429099 1/1976 Fed. Rep. of Germany ........ 379/89

OTHER PUBLICATIONS

Roger L. Freeman, "Data Networks and Their Operation", Telecommunications System Engineering, pp. 392–406, John Wiley & Sons, 1980.

"Digital Techniques for Computer Voice Response: Implementations and Applications", L. R. Rabiner et al., Proc. of the IEEE, vol. 4, No. 4, Apr. 1976, pp. 416–433.

"The Audio Response Unit", D. R. Smith, CONCOMP Tech, Report 27, Univ. of Michigan, Apr. 1970.

"KEYPAC-A Telephone Aid for the Deaf", R. A. Pavlak et al., IEEE Trans on Communs., vol. COM-27, No. 9, Sep. 1979, pp. 1366–1371.

Primary Examiner—Thomas W. Brown
Attorney, Agent, or Firm—Parmelee, Bollinger & Bramblett

[57] ABSTRACT

A telephone system wherein any one of a large number of telephones is connectible to a local directory-assistance request processor. The name of a subscriber whose telephone number is sought is entered through a connected telephone by spelling out the subscriber's name with the standard telephone push-buttons, using the grouped alphabetic designators on those buttons. The resulting decimal signals are stored in the request processor, and also are forwarded by a digital transmission system to the appropriate one of a number of directory processors each having a subscriber data base in alphanumeric code. A look-up is carried out to locate the alphanumeric code data identifying the subscriber's name corresponding to the originally-entered decimal request signals, and the located alphanumeric information including name and telephone number is sent back through the digital transmission system to the request processor. The alphanumeric code data is used at that processor to control a voice-response unit which directs to the originating telephone corresponding speech signals identifying the subscriber's name and telephone number.

2 Claims, 1 Drawing Sheet

APPARATUS AND METHOD FOR OBTAINING INFORMATION IN A WIDE-AREA TELEPHONE SYSTEM WITH DIGITAL DATA TRANSMISSION BETWEEN A LOCAL EXCHANGE AND AN INFORMATION STORAGE SITE

This application is a continuation of Ser. No. 229,557 filed Aug. 5, 1988, now abandoned which is a division of application Ser. No. 069,828 filed July 6, 1987, now U.S. Pat. No. 4,782,509, which is a continuation of application Ser. No. 644,811, originally filed Aug. 27, 1984, now abandoned.

BACKGROUND OF THE INVENTION

1. Field of the Invention

This invention relates to telephone systems providing directory assistance or similar types of information to subscribers. More particularly,. this invention relates to automatic directory-assistance systems.

2. Description of the Prior Art

The principal telephone system in the United States provides for directory assistance through the use of special dialing codes which bring an operator on the line. For example, to obtain long distance information, one would enter the area code (e.g. 617), followed by 555-1212. The operator typically responds by asking "which city". Upon satisfactory response to that query, the operator asks for the name of the party whose telephone number is sought. In certain areas today, the operator then activates some type of equipment which presents to the operator a display which lists the name or names most closely fitting the information given to the operator by the caller. Upon identifying the desired party's number, the operator will either continue by speaking the telephone number, or by activating a voice-response device which generates spoken words electronically identifying the teleohone number.

Various kinds of equipment have been proposed for assisting in carrying out the directory assistance function such as described above. For example, U.S. Pat. No. 4,341,929 (Alexander et al) discloses a data retrieval system for use in telephone directory searching and which employs a data entry unit having individual keys for all of the alphabetic and numeric characters. However, such prior art directory assistance systems suffer from the disadvantage of requiring human (operator) action in responding to a request for assistance.

SUMMARY OF THE INVENTION

In a preferred embodiment of the invention to be described in detail hereinafter, there is provided a fully-automatic telephone directory assistance system. In this system, the party seeking assistance enters all of the request data through the standard telephone keys, commonly comprising an array of push-buttons. (Dial equipment may also be used, but that version will not be described for the sake of simplicity; however, it should be noted that the terms "key" and "key in" are used herein to encompass both push-button and dial signalling devices.)

More specifically, the alphabetic request information (city, subscriber's name) is entered using the alphabetic designators already on the push-buttons. Local request processing apparatus (e.g. at the local exchange) receives and stores the signals identifying the request, and directs corresponding digital signals to a directory look-up station where the appropriate subscriber data base is scanned for comparison with the subscriber identifying data from the originating telephone. When a match is found, the corresponding subscriber identification and telephone number is sent by alphanumeric code signals back to the request processing station. There, a voice-response device is activated by such code signals to send through the telephone voice channel of the requesting party speech signals identifying (1) the name of the subscriber, for verification, and (2) the telephone number of the subscriber.

It may particularly be noted that the signals entered through the telephone keys by the requesting party are decimal signals. That is, the telephone numeric keys produce only ten different signals, with eight of such signals identifying groups of alphabetic letters (ABC, DEF, etc.). Thus, the directory assistance request signals have an inherent ambiguity. For example, if the number "2" button is pressed to produce a signal identifying one letter of a subscriber's name, the signal could represent "A", "B" or "C" of the group of letters ABC associated with the number 2 push button.

However, it has been found that in looking up subscriber names, this ambiguity can (generally) be resolved even in large directories from the additional information available from the redundancy in names. That is, for the most part, such redundancy results in a decimal code uniquely identifying the subscriber whose number is sought. There must be provision anyway for handling parties with identical names, an ambiguity of much greater frequency, and simple procedures can be carried out in the system of the present invention to resolve remaining ambiguities of either type.

In accordance with another aspect of the present invention, significant improvement in efficiency is achieved because the system employs digital transmission in all of the required data transfers except for the relatively short segment between the calling subscriber and the local exchange or nearby center. In prior art systems, in comparison, quite lengthy voice-grade transmission channels typically are used to connect the inquiring party to an operator at the subscriber data base. For example, an inquiring party in Stamford, Conn., might be connected by a voice channel to an operator at the regional data base in San Francisco, Calif., in order to find the telephone number of a subscriber in San Francisco. In accordance with aspects of the present invention, however, the inquiring party need communicate through a voice channel only as far as the local exchange, and all other data transfers from that point on can be carried out using digital codes, resulting typically in efficiency improvement of a factor in excess of 100 to one for the long distance leg of the communication.

In accordance with still further features of the invention, efficiency also is enhanced by the concentration factor achieved through multiplexing. For example, with multiplexing, a single voice-response device at a local request processor can simultaneously service a relatively large number of voice lines leading to subscribers' telephones. Similarly, the digital traffic to and from the local request processor can, with multiplexing, be handled by a single digital link to the digital network.

Accordingly, an object of this invention is to provide a more economical system for obtaining information from a distant source when this information is to be voiced to the caller. A more specific object of this invention is to provide a simple fully-automatic system for obtaining information from any telephone without need for operator intervention. Other objects, aspects and advantages of the invention will in part be pointed out in, and in part apparent from, the following description of a preferred embodiment of the invention, considered together with the accompanying drawings.

DETAILED DESCRIPTION OF A PREFERRED EMBODIMENT

Figure 1:
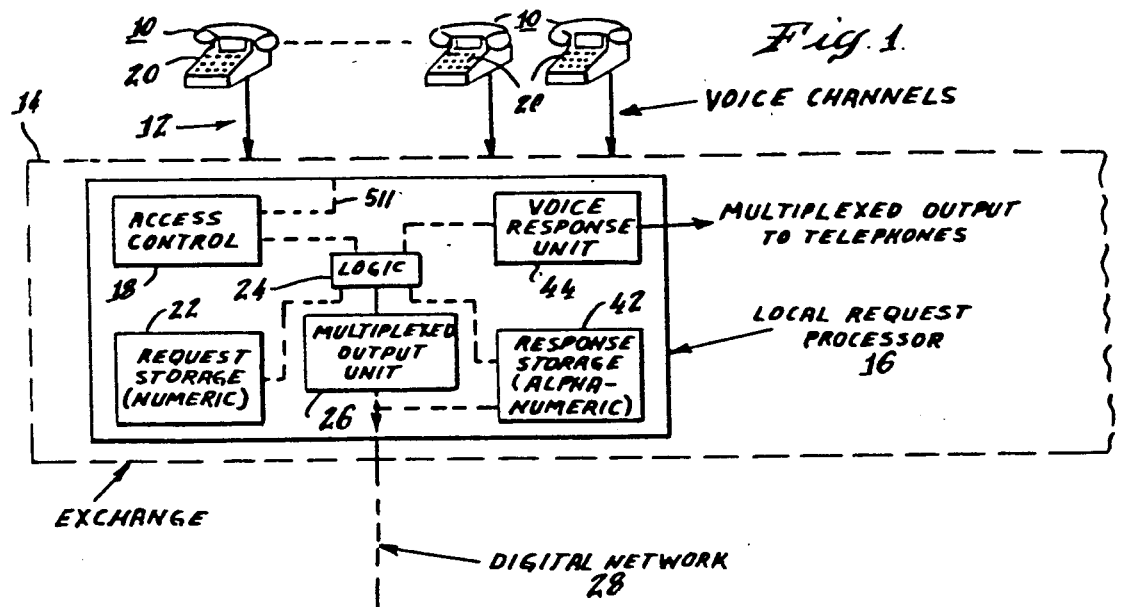
FIG. 1 is a block diagram illustrating the principles of the present invention.

Referring now to FIG. 1, there is shown a group of standard telephones 10 each connected by a corresponding voice channel 12 to a local telephone exchange generally indicated at 14. This exchange includes the usual switching equipment, responsive to coded signals from the telephones 10, for effecting interconnection between subscribers.

Located at the exchange 14 is a set of equipment, referred to herein as a Local Request Processor 16, for handling requests for directory assistance. Access to this equipment might for example be effected by keying-in a simple local number such as 511. The equipment would include means responsive to the input of such local number, illustrated in FIG. 1 as Access Control 18, for making connection to the calling telephone. In typical exchanges the apparatus used to process an incoming call to establish connection between the telephone and a Local Request Processor is in fact relatively complex; since it does not form part of the present invention, description of such apparatus will be omitted for the sake of brevity.

After connection has been established between the calling telephone 10 and the Local Request Processor 16, the customer enters data spelling out the particular request for directory assistance. The data is entered in decimal (numeric) code, preferably using the standard set of "Touch-Tone" or "Touch-Call" (trademarks of AT&T and GTE respectively) push-buttons generally indicated at 20, and referred to herein generically as "touch-type" push-buttons. Alphabetic information, such as city or subscriber name, is entered by using the alphabetic designators carried by the push-buttons 20. The entered data is stored in a Request Storage Unit 22.

It should be noted that each alphabetic-indicating decimal signal stored is the only information available to represent the corresponding alphabetic character. That is, the information represented by a given decimal signal is not qualified or conditioned by other signal input information, as it is in known touch-type data entry systems where actuation of two (or more) telephone pushbuttons is used to indicate a particular alphabetic character.

In a typical sequence, the customer first would enter the area code of the region where the phone of the subscriber being sought is located. This would be followed by the city name (or a one or two letter abbreviation therefor). Next, a zero would be entered to indicate the end of the city name. Then, the customer would enter the last name of the person or company desired, followed by a zero as a separator, and followed by the first name or initial (or second word of company name). Finally, two zeros might be keyed in to indicate end of entry. (The use of the pound sign or star in touch-type telephone equipment may be preferable but the use of zero (and/or one) makes the description of the system equally applicable to systems where signals are keyed-in with dial-pulse data entry equipment.)

The Local Request Processor 16 includes Logic 24 for handling a variety of chores. One function is to check the entered decimal code data for format. If that test is passed, the sequential decimal signals in Request Storage 22 are developed as an outgoing message by an Output Unit 26 under control of Logic 24. The message preferably is formatted in an "envelope" indicating start, end, voice channel number and telephone exchange of origin. Such message might for example be in ASCII code.

The developed message signal is directed from the Output Unit 26 to a digital network 28 for transmittal on to one of a number of Directory Processors 30 (the selection being determined by the area code), where it is placed in a Request Storage Unit 32. The Directory Processor would likely be located at the 555-1212 center for the given area code, but it could be located at further centralized or decentralized locations, depending upon system considerations.

The Directory Processor 30 includes a Subscriber Data Base 34 which contains all of the directory information typically stored in a regional 555-1212 center. This data is alphanumeric, i.e. the stored signals define each of the data characters explicitly, without ambiguity. The request signals in Request Storage 32, on the other hand, are decimal. As noted above, each of such decimal signals may specify any one of a corresponding group of alphabetic characters, resulting in a degree of ambiguity for individual characters. However, because of the redundancy of information in names, it is possible (for the most part) to use decimal signals to uniquely identify a corresponding subscriber name in a directory data base.

Various procedures can be employed for carrying out a "look-up" of the subscriber name corresponding to a decimal request signal. One procedure presently preferred is to sort the names in the alphanumeric data base 34 decimally, to produce a corresponding Decimal Directory Storage 36. Such Decimal Directory Storage would present all of the name data as though it had been produced by entering the alphanumeric characters through a set of standard telephone numeric keys, using their grouped alphabetic designators for developing the numeric data (decimal signal) for each of the alphabetic characters. For example, for a subscriber name "JONES", the decimal data base would contain the numeric signals for 5-6-6-3-7.

The actual look-up procedure then is carried out simply by comparing the decimal signals in Request Storage 32 with the signals in the Decimal Directory Storage 36, as by means of a Look-up Comparator 38. When a match is found, Logic 40, forming part of the Directory Processor 30, reads out selected corresponding alphanumeric subscriber information (i.e. name and telephone number) from the Subscriber Data Base 34. This subscriber information then is sent, still in alphanumeric code, back through the digital network 28 to the Request Processor 16. Other subscriber information such as city and street address may or may not be included depending on policy.

The alphanumeric information sent back to the Request Processor is stored in a Response Storage Unit 42 of known design. The Logic 24 in the Request Processor supervises the storage of these signals, and operates to control a Voice Response Unit 44 in accordance with the signals, so as to send through the voice channel of the telephone being serviced corresponding signals producing a group of speech sounds (identifying alphabetic letters, words and/or phrases) conveying the requested directory information.

The overall request/response procedure might, for example, be carried out as follows:

| Entered data: | | | | | | | | |
|---|---|---|---|---|---|---|---|---|
| 511 Access Number | (Pause) Wait for Connection | 914 Area Code | RYE City Name | 0 Separator | SHEPARD Name | 0 Separator | DAVID Name | 00 End |

Voice response:

"The listing for S-H-E-P-A-R-D D-A-V-I-D is 967-2952. Repeating, 967 2952".

While in the above illustration the city name is keyed in as in current normal directory assistance procedure, it is usually unnecessary within an area code and probably best left out unless needed later in the communication to resolve an ambiguity.

The standard touch-type push-button array makes no provision for the letters "Q" and "Z". However, in the system of the present invention, it is necessary that all letters of the alphabet be available for data entry. A simple solution to this problem is to assign "Q" and "Z" to respective logically associated push-buttons the subscriber could easily remember, e.g. the buttons for numbers 7 and 9 respectively, as shown in the following table:

| Numeral | Letter Group |
|---|---|
| 1 | — |
| 2 | ABC |
| 3 | DEF |
| 4 | GHI |
| 5 | JKL |
| 6 | MNO |
| 7 | PQRS |
| 8 | TUV |
| 9 | WXYZ |
| 0 | — |

The conventional push-button arrays also include additional buttons labelled "*" (star) and "#" (pound sign), which produce corresponding distinctive tone signals from the telephone. These non-numeric designators can be used in the present system to provide special controlling functions for the directory assistance equipment. For example, the star key can be used in place of the zero as a separator between words, and the pound key can be used to indicate end of entry.

The look-up procedure described above will at times develop multiple listings for a single inquiry. To resolve this ambiguity, the Directory Logic 40 may in accordance with a further aspect of the invention be arranged to forward the alphabetic codes for all of the multiple name listings (up to some reasonable limit) to the Local Request Processor 16. At that station, the Voice-response Unit 44 would be controlled by the code signals and Logic 24 to ask the subscriber for further information such as a street name or middle initial. If the subscriber can supply such information, the voice-response unit will complete the inquiry by reading out the telephone number of the so-identified correct subscriber, in the usual fashion. If not, each of the possible listings can be given to the subscriber. In either event, no communication to the remote data base is required since all the possible listings have already been transmitted to the local processor.

In the special, relatively less frequent case above where the ambiguity resulted from using numeric codes, the Logic 24 would realize that spellings of different names were involved and cause the Voice-Response Unit 44 to spell out each of the names, asking the subscriber to key "Y" or "N" for "yes" or "no" to identify the correct name. Still other procedures may be used in accordance with these principles to handle the other various situations which are encountered.

The Digital Network 28 is shown as a single line in FIG. 1, but in a commercial system the network would very likely be quite complex. It should be understood that the present invention is not based on any particular type of digital network, and that any of a number of different types of networks could be selected, depending upon optimizing system considerations. Simply as an example, FIG. 2 is included to illustrate one type of digital network which might be suitable.

Figure 2:
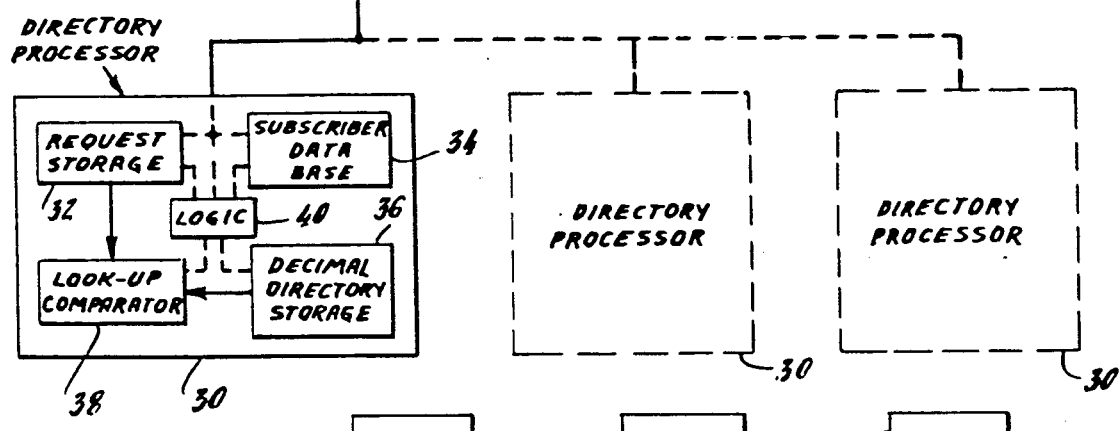
FIG. 2 is a diagram showing one form of data transmission system suitable for use in the arrangement of FIG. 1.
Figure 2:
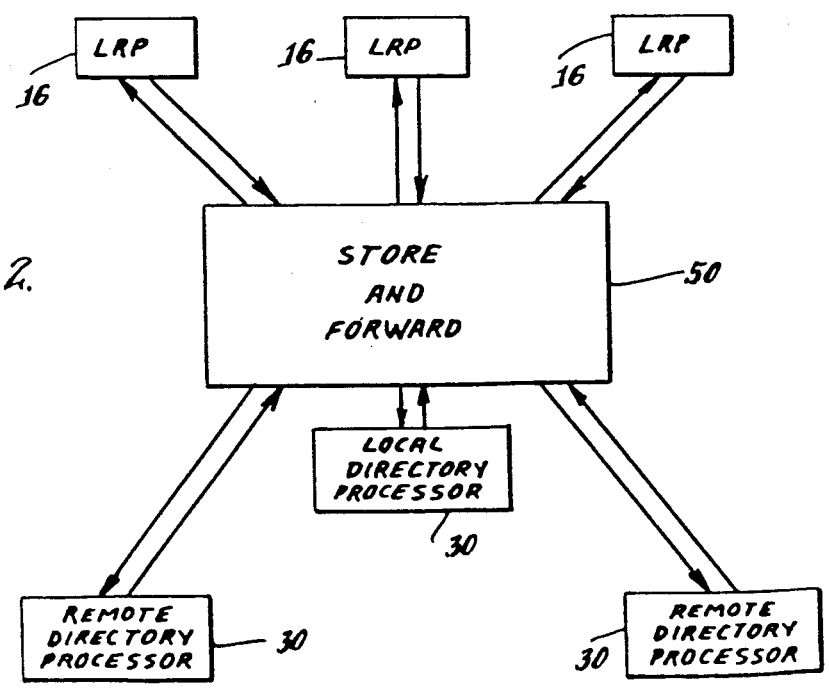

The FIG. 2 network 28 is of the so-called "star" type, having as its central feature a Store and Forward unit 50 of conventional design. Connected to this unit are a number of LRPs (Local Request Processors), such as that shown at 16 in FIG. 1. Each of these LRPs might be located at a central telephone exchange (e.g. the types of exchanges identified in the telephone industry as Class 4 or Class 5 exchanges). Although only one Store and Forward unit is shown in FIG. 2, there would in such a system be a number of such units, with appropriate interconnections therebetween. Such units probably would be at centralized locations, much fewer in number than the telephone exchanges.

Also connected to the Store and Forward unit 50 are a number of Directory Processors (DPs), such as that indicated at 30 in FIG. 1. One is shown as a Local Directory Processor (i.e. near the Store and Forward unit), and the others are remote from the Store and Forward unit. These Directory Processors would include apparatus such as illustrated at 30 in FIG. 1. The illustrated system is based on the assumption that the remote Directory Processors would have sufficient traffic to justify a dedicated digital channel to each Directory Processor.

Typical LRPs would be capable of handling a number of simultaneous voice channels 12, such as 16 or 64 channels each. The LRP would poll in turn each of the digital circuits (not shown) conventionally associated with each voice channel 12, seeking requests to send, thus supervising an orderly flow of decimal request signals. As noted hereinabove, the request information would be developed in conventional message format comprising an "envelope" indicating start, end, and voicechannel number of origin. At the Store and Forward unit 50, the identity of the originating LRP would be added to the message. This message would be stored and (essentially simultaneously) re-transmitted on to the designated Directory Processor 30 (as determined by the area code). Such re-transmittal of the message preferably would employ an arrangement wherein sub-storage units are polled to determine which has a completed message ready to be sent on, in order to assure orderly traffic on the links to the Directory Processors.

After the receiving Directory Processor has received a request message, and has made the required look-up, it transmits its reply message back to the requesting Store and Forward unit. This unit in turn, relays the message on to the originating LRP, and within that LRP through the Logic 24 and the Voice-Response Unit 44 to the requesting telephone line. U.S. Pat. No. 3,534,171 (Shepard et al) shows a multiplexing arrangement permitting a single voice-response unit to service a number of separate channels effectively simultaneously.

There are many possible variants of digital networks which can be selected to satisfy particular requirements. For example, in less populated areas, it may be more economical to "chain" LRP units, with each LRP monitoring only a small number of voice channels. LRPs in the middle of the chain could contain a small "Store and Forward" which would merge the LRP's own requests with digital requests coming from further down the chain. In the opposite direction (that of the "answer" messages) each LRP would simply monitor the channel for information pertaining to itself. Thus, in some cases, chains of LRPs might substitute for legs going to individual LRPs in the FIG. 2 arrangement. Similarly, where sufficient traffic does not exist from a center to a remote DP station to merit a separate digital channel, a nearby DP station could act in a store and forward capacity.

Although specific embodiments of the invention have been described hereinabove in detail, this has been for the purpose of illustrating the principles of the invention, and should not necessarily be construed as limiting of the invention since it is apparent that those skilled in the art can make many modified arrangements based on the principles of the invention without departing from the true scope thereof.

What is claimed is:

1. The method of obtaining information stored in alphanumeric code in at least one location in a geographical region by operating a telephone in a telephone system of the kind including a plurality of local exchanges located remotely from each other in said geographical region with each local exchange being connectable by respective voice-grade channels to any of a corresponding set of telephones associated with that local exchange, said telephones including keying means for producing decimal signals, said keying means comprising a set of touch-type push-buttons which when pressed produce a respective distinctive signal of decimal character, each push-button designating a group of alphabetic letters and an associated numeral so that the decimal signals produced by each of said set of push-buttons can be used to represent the corresponding alphabetic group or the associated numeral; said keying means being operable with said telephone system to effect voice-transmitting connection between any one of said telephones associated with any of said local exchanges to any other of said telephones; the telephone system further including a non-voice-grade digital data transmission network connecting all of said local exchanges to said one location where said alphanumerically coded information is stored;

said method comprising the steps of:

operating said push-buttons at any one of said telephones of any of said sets of telephones to produce a request signal in the form of a plurality of decimal signals representing a corresponding sequence of alphanumeric characterist identifying the information desired from that stored in said one location;

directing said decimal signals through the respective voice-grade channel from said one telephone to the corresponding local exchange;

storing said decimal signals of said request signal at a request processor at said corresponding local exchange;

directing signals corresponding to said request signal in digital decimal signal format through said digital data transmission network to an information retrieval processor at said one location, said information retrieval processor including storage means storing alphanumerically-coded data identifying information of potential interest;

storing said decimal-signals request signal in a request storage unit at said information retrieval processor;

carrying out a look-up of said stored information at said information retrieval processor to locate the alphanumerically-coded data desired as identified by the decimal signals stored in said request storage unit;

directing back through said digital data transmission network, from said information retrieval processor to said corresponding local exchange, digital alphanumeric signals representing said particular information;

storing in a response storage unit at said request processor at said corresponding local exchange alphanumeric reply signals corresponding to said alphanumeric signals sent back through said digital data transmission network;

operating a multiplexed voice-response unit at said corresponding local exchange in accordance with said stored alphanumeric reply signals to develop multiplexed speech signals identifying said particular information; and directing said developed multiplexed speech signals through said respective voice-grade channel back to said one telephone to furnish the requested information to the person operating said one telephone.

2. The method of claim 1, wherein the information sought is the telephone number of a party.

* * * * *